No. 653,652. Patented July 17, 1900.
C. BIGELOW.
VEHICLE WHEEL.
(Application filed Jan. 4, 1900.)
(No Model.)
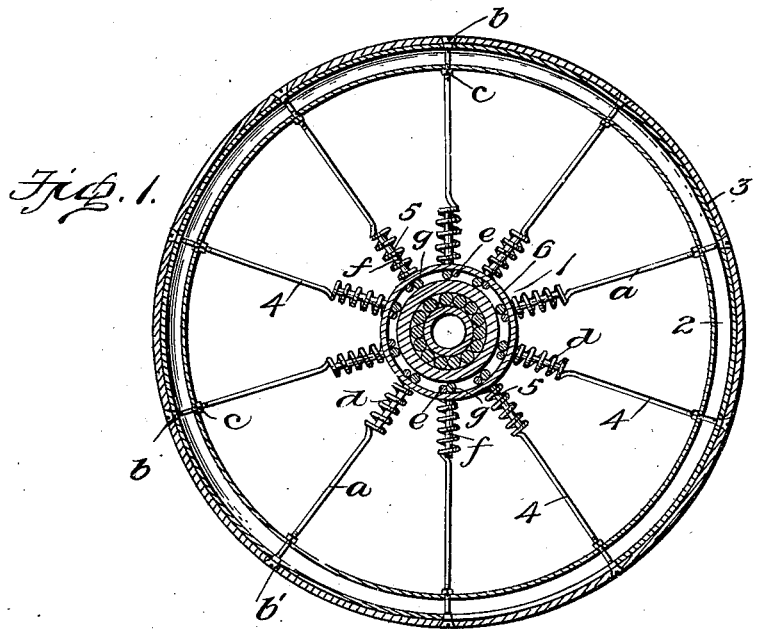
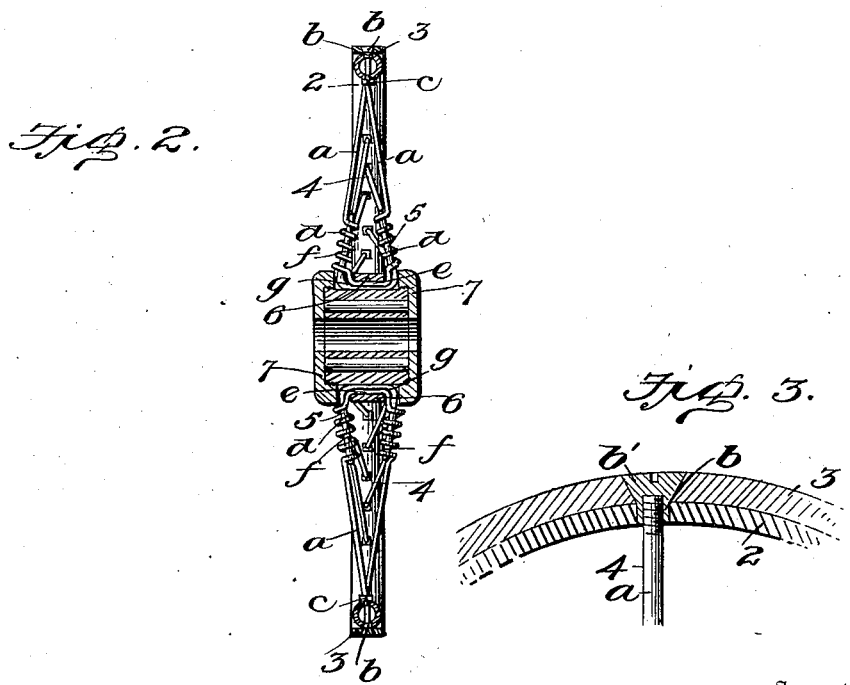
Witnesses
Inventor
Charles Bigelow
by H. B. Willson & Co.
Attorneys

UNITED STATES PATENT OFFICE.

CHARLES BIGELOW, OF DELTA, COLORADO.

VEHICLE-WHEEL.

SPECIFICATION forming part of Letters Patent No. 653,652, dated July 17, 1900.

Application filed January 4, 1900. Serial No. 332. (No model.)

*To all whom it may concern:*

Be it known that I, CHARLES BIGELOW, a citizen of the United States, residing at Delta, in the county of Delta and State of Colorado, have invented certain new and useful Improvements in Vehicle-Wheels; and I do declare the following to be a full, clear, and exact description of the invention, such as will enable others skilled in the art to which it appertains to make and use the same.

The invention relates to vehicle-wheels.

The object of the invention is to provide a wheel which will possess all the advantages of a pneumatic-tired wheel and none of the objections, which will be strong and durable, and which will give or accommodate itself to rough roads and take up the jar or motion commonly experienced in coming in contact with an obstruction in the road.

To this end the invention consists in certain features of construction and combination of parts, which will be hereinafter fully described and claimed.

In the accompanying drawings, Figure 1 is a vertical sectional view through the wheel. Fig. 2 is a similar view at right angles to Fig. 1. Fig. 3 is an enlarged detail sectional view to more clearly illustrate the manner of securing the outer ends of the spokes and the tire to the rim of the wheel.

In the drawings the same reference characters indicate the same parts of the invention.

1 denotes a roller-bearing hub; 2, the tubular rim of the wheel; 3, the tire; 4, the spokes, and 5 the guide-rods for the spokes. The spokes each consist of the straight portions $a$, the outer ends of which are inserted through the tubular rim and are held in place by nuts $b$ and $c$, the former to prevent the spokes withdrawing from the tubular rim and the latter to prevent them being forced too far through the rim. The nut $b$ has a tapering solid head $b'$, provided with a niche, which fits in a countersunk aperture in the tire and, in addition to preventing the withdrawal of the spokes from the rim, serves to hold the tire to the rim. The lower ends of the portions $a$ of the spokes are formed into coil-springs $d$, the lower ends of which are connected by an integral cross-piece $e$, which rests upon the hub. It will thus be seen that from a single piece of wire I construct two spokes.

The guide-rods 5 consist of the upwardly-extending portions $f$ and the horizontal cross-pieces $g$. The portions $f$ extend upwardly through the coils of the springs and serve to guide them in their compression and expansion. The cross-pieces $e$ and the cross-pieces $g$ of the springs and guide-rods, respectively, are held in place by an encircling band 6, and this band is prevented from sliding off said hub by the screw-caps 7.

From the foregoing description, taken in connection with the accompanying drawings, the construction, operation, and advantages of my improved vehicle-wheel will be readily apparent without requiring an extended explanation. It will be seen that the wheel is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

The combination with the hub of a wheel; of spokes the inner ends of which are connected by integral cross-bars and are provided with coil-springs, guide-rods which project through the spring-coils and have their inner ends connected together by cross-pieces, a band surrounding said hub and the cross-pieces of the guide-rods and springs, caps for preventing the band slipping off the hub, a rim to which the outer ends of the spokes are attached, and a tire secured to said rim, substantially as and for the purpose set forth.

In testimony whereof I have hereunto set my hand in presence of two subscribing witnesses.

CHARLES BIGELOW.

Witnesses:
   J. C. GALLAND,
   CHARLES BEER.